(No Model.)
I. HOGELAND.
ELECTRICALLY OPERATED AGRICULTURAL MACHINE.
No. 557,809. Patented Apr. 7, 1896.
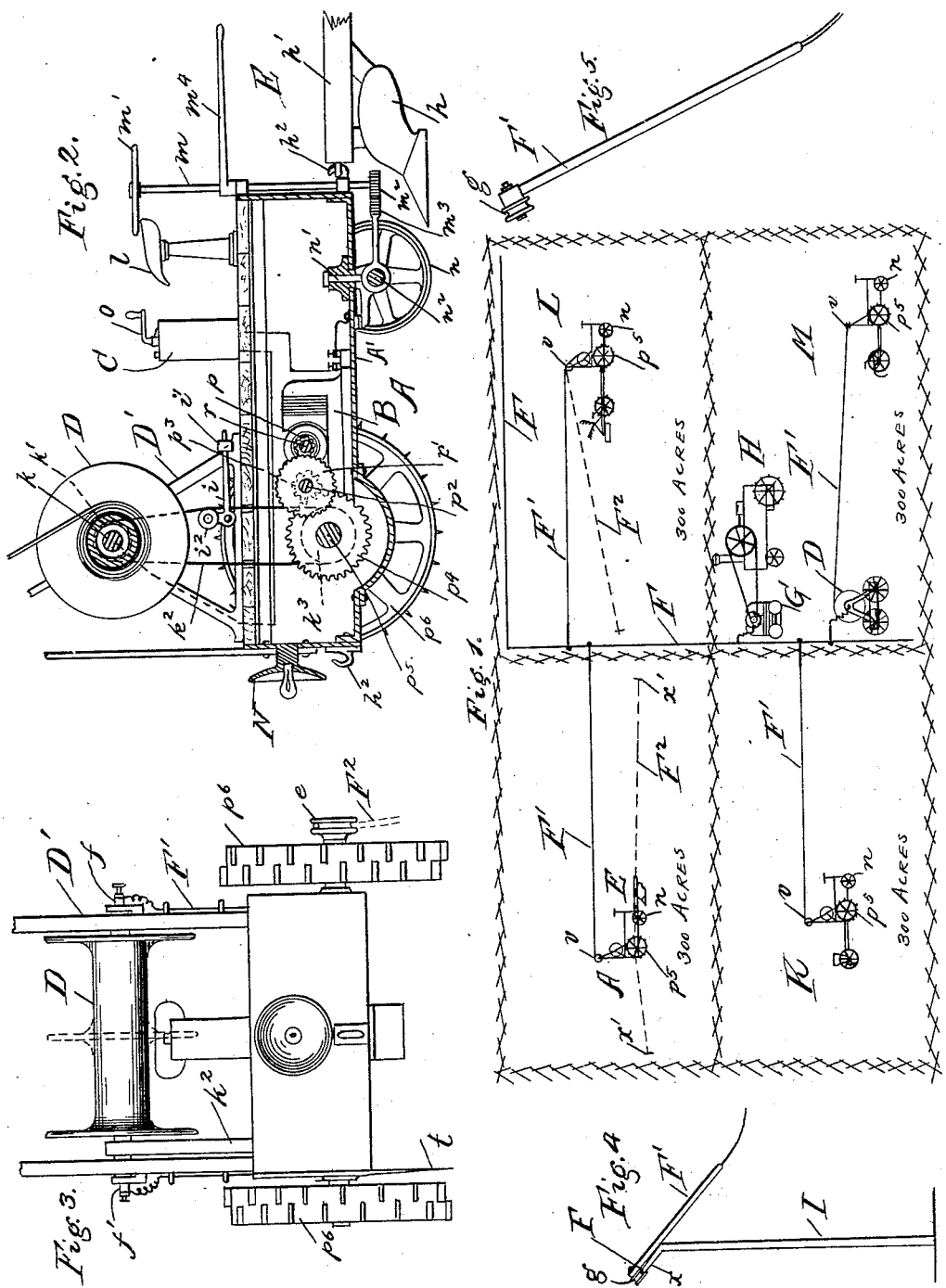
Witnesses:
M. S. Mackenzie
Richard Spencer
Inventor:
Israel Hogeland
By Dyrenforth & Dyrenforth,
Attys.

UNITED STATES PATENT OFFICE.

ISRAEL HOGELAND, OF CHICAGO, ILLINOIS, ASSIGNOR OF ONE-HALF TO PAUL E. BERGER, OF SAME PLACE.

ELECTRICALLY-OPERATED AGRICULTURAL MACHINE.

SPECIFICATION forming part of Letters Patent No. 557,809, dated April 7, 1896.

Application filed November 22, 1895. Serial No. 569,796. (No model.)

*To all whom it may concern:*

Be it known that I, ISRAEL HOGELAND, a citizen of the United States, residing at Chicago, in the county of Cook and State of Illinois, have invented a new and useful Improvement in Electrically-Operated Agricultural Machines, of which the following is a specification.

The object of my invention is to provide for utilizing effectively, reliably, and economically electricity as the motive power for all agricultural machines of the locomotive variety to cause them to perform their various functions, such as plows, grain-drills, mowers, reapers, rakes, and the like. To this end I provide a main electric-current-supply wire, preferably in elevated position, to extend throughout the length or width, or both, of a field of any desired area and to which the electric current is supplied by a dynamo-electric machine driven by a suitable engine. From this main conductor I lead any desired number of branch conductors, each over a suitable take-up and pay-out device, to an electric motor on the particular machine to be driven, and from which the current is suitably grounded, (or returned to the main conductor,) the motor being geared with the running-gear of the machine to propel it. In the travel of the machine in the direction from the main conductor the branch conductor pays out and in its travel in the opposite direction the branch conductor is gathered up, since it performs no function in the matter of producing the locomotion of the machine other than, to that end, supplying the current to the electric motor with which it is equipped.

Referring to the accompanying drawings, Figure 1 is a diagrammatic view representing a field fenced off into farms of three hundred acres each, and having extended across it and along a portion of its length the supply-current conductor connected with the electric generating mechanism and from which leads in each subdivision a branch conductor to an electric motor on a locomotive agricultural machine. Fig. 2 is a broken longitudinally-sectional view of a locomotive-plow equipped with the electric motor for driving it and with the take-up and pay-out mechanism for the branch conductor or conductors; Fig. 3, a front end view of the same; Fig. 4, a broken view showing one of the poles by which the main conductor is supported in overhead position and the connection therewith of a branch conductor for taking off the current; and Fig. 5, a similar view of the branch conductor, showing the trolley at one of its ends by which it is applied to the main conductor.

For the purpose of detailed illustration of my invention I have selected a locomotive-plow, (shown in Figs. 2 and 3,) and the explanation hereinafter contained of the details of the mechanism involved in the invention is therefore confined to that particular kind of machine. However, the same details may in the main be employed with any of the varieties of locomotive agricultural machines, so that their explanation in the particular connection with a locomotive-plow will suffice.

A is a locomotive plowing-machine, the body portion A' of which I prefer to form of metal. On the plowing-machine A is supported an electric motor B, of usual or any suitable construction, carrying on its armature-shaft $r$ a pinion $p$, meshing with a cog-wheel $p'$ on a shaft $p^2$, which carries a pinion $p^3$, meshing with a cog-wheel $p^4$ on the axle $p^5$ of the front wheels $p^6$ of the machine. The motor is controllably connected in the usual manner with a suitable or well-known form of switch device C, provided with an operating-handle $o$, this switch device being, if desired, the same in its operation and purpose as that commonly provided on electric cars.

The rear wheels $n$ of the machine should have their axle supported on the body A' by a king-bolt $n'$ in order that the machine can be conveniently steered and turned; and for steering and turning it I show in Fig. 2 a hand-wheel $m'$ on a vertical shaft $m$, carrying at its lower end a pinion $m^2$, meshing with a rack $m^3$, extending from the rear axle $n^2$. Forward of the steering-shaft $m$ is supported the driver's seat $l$, and the steering-shaft also carries an operating-lever $m^4$ on a lower plane than the hand-wheel $m'$ in order that the steering may conveniently be performed from the ground.

D is a winding-drum journaled in a frame D' on the body A' near the forward end of the machine, and the shaft $k$ of the drum carries a pulley $k'$, from which it is connected by an endless band $k^2$ with a pulley $k^3$ on the forward axle $p^5$. Adjacent to the endless band $k^2$ on the body A' is fulcrumed a bell-crank lever $i$, carrying at one end a weight $i'$ and at its opposite end a roller $i^2$, normally bearing against the band to tighten it and thereby cause the drum D to be rotated from the axle $p^5$.

E is the plow, shown as a plowshare $h$, fastened to a beam $h'$, connected at one end with a hook $h^2$ on the end of the body portion of the machine. One of these hooks $h^2$ is shown to be provided at each end of the machine in order that the plow may be applied at either end thereof.

F is the main electric conductor or line-wire leading from a suitable electric generator (represented as a dynamo G) driven by an engine H, which may be any ordinary so-called "farm engine." The conductor F is preferably supported overhead on poles I, bent to an angle, as represented at $x$ in Fig. 4. These poles are placed at desired distances apart along the route traversed by the line-wire, which, as represented in Fig. 1, extends across the entire field and lengthwise throughout about one-half thereof.

F' is an insulated branch conducting-wire carrying at one end a trolley-wheel $g$, at which it seats on the conductor F. From the main conductor the branch F' extends to the winding-drum D, and through the latter to a binding-post $f$, from which it proceeds to one side of the motor. From the other side of the motor there may lead, by way of a binding-post $f'$ to the drum D, to be wound thereon like the branch conductor F', and over the guide-pulley $v$ on the frame D' of the drum, and over which guide-pulley the conductor F' also passes, a ground-wire $F^2$. Instead of the ground-wire $F^2$ the current from the motor may be grounded through the wheels $p^6$ on the machine, and these wheels may be supplemented in their grounding function by a knife-edged attachment $t$, supported on a side of the body portion A' adjacent to a wheel $p^6$, to extend lower than the latter and penetrate the ground through any insulating matter that may be thereon, and this current-grounding function may be further increased by anchoring to the ground at its opposite ends, as indicated at $x'$ in Fig. 1, a wire extending along the route of the machine and passing between its ends over a guide-pulley $e$ on one extremity of the axle $p^5$.

As hereinbefore suggested, the locomotive-machine to be driven may be the plow A, or it may be a grain-drill, (indicated at K in Fig. 1,) or a combined reaper and mower, (indicated at L in that figure,) or a raking-machine M, (also indicated in the same figure,) and whatever the particular kind of machine it is equipped with the electric motor B, to be operated the same as the plowing-machine, as follows: With current on the main-line conductor F and a branch conductor F', leading therefrom in the manner described to the motor B on the particular machine, the motor is actuated to turn the axle $p^5$ and drive the machine in one direction or the other with relation to the line conductor F, depending upon the proper manipulation of the switch device C. In traveling from the line conductor F the bell-crank lever $i$ should be raised on its fulcrum to withdraw the roller $i^2$ from contact with the endless band $k^2$, in order that it shall be loose and not transmit power from the axle $p^5$ to the drum-shaft. Then as the machine proceeds in its course the branch wire F' and ground-wire $F^2$ (if the latter be provided) will freely pay out from the drum. When the machine is caused to travel in the opposite direction, either backward, as it may be, or by turning it around, as may be done by properly working the steering device either from the handle $m'$ or from the handle $m^4$, and the bell-crank lever is adjusted to bring the roller $i^2$ against the endless belt and thereby tighten it to cause the power from the rotary axle $p^5$ to be transmitted to the drum-shaft, and thereby rotate it to wind upon it the branch conductor F' (and also the ground-wire $F^2$, if the latter be provided) and thus take it up as the machine proceeds on its course.

After the machine has traversed one line its branch conductor F' may be readily shifted on the main conductor F by simply shifting the trolley $g$, and the anchorage of the ground-wire, if provided, may be accordingly shifted.

In Fig. 1, at the right-hand side near the bottom thereof, where the raking-machine M is represented, I show the winding-drum D separate from the machine and supported on wheels in stationary position on the ground adjacent to the main-line conductor F. This is merely to indicate that the winding-drum need not necessarily be located on the machine. For winding upon the drum in this situation the branch conductor F' the drum may be operated by hand-power, or a suitable separate motor may be provided for operating it. The equipment of the machine with electric motive power renders it a matter of convenience to provide, in the usual way, electric light for lighting the course of the machine and enabling it to be operated at night. To this end an electric lamp, forming a headlight N, is shown to be provided at the forward end of the plowing-machine, as illustrated in Fig. 2.

By providing the main conductor F to extend lengthwise of as well as across the field the machines, of which any desired number may be operated at the same time, may conveniently be caused to travel lengthwise or transversely of the field.

What I claim as new, and desire to secure by Letters Patent, is—

1. In a field, the combination of a main conductor F, one or more branch conductors F' leading from said main conductor, a dynamo-electric machine G connected with said main conductor, an engine H for driving the dynamo, and a locomotive agricultural machine carrying an electric motor connected with the running-gear of the machine to propel it and connected with one of said branch conductors, a ground-wire extending from said motor, and take-up and pay-out mechanism about which said branch conductor and ground-wire are wound in corresponding directions, whereby both pay out as the locomotive-machine moves away from the main conductor and both are taken up as said machine moves toward the main conductor, substantially as described.

2. In a field, the combination of a main conductor F, one or more branch conductors F' leading from said main conductor, a dynamo-electric machine G connected with said main conductor, an engine for driving the dynamo, and a locomotive agricultural machine carrying an electric motor connected with the running-gear of the machine to propel it, and connected with one of said branch conductors, a ground-wire anchored at opposite ends and passing between its ends over a guide-pulley $e$ on an axle of the machine, and take-up and pay-out mechanism for the branch conductor, substantially as described.

3. In a field, the combination of a main conductor F, one or more branch conductors leading from said main conductor, a dynamo-electric machine G connected with said main conductor, an engine H for driving the dynamo, and a locomotive agricultural machine carrying an electric motor B connected with the running-gear of the machine to propel it and connected with one of said branch conductors, take-up and pay-out mechanism for the branch conductors, a ground-wire attachment anchored at opposite ends, and passing between its ends over a guide-pulley $e$ on an axle of the machine, and a ground-cutter $t$ on said machine, the whole being constructed and arranged to operate, substantially as described.

ISRAEL HOGELAND.

In presence of—
J. H. LEE,
J. N. HANSON.